Dec. 6, 1927.

D. P. THOMSON 1,652,134

INCLOSED DYNAMO ELECTRIC MACHINE

Original Filed May 1, 1926

Inventor:
David P. Thomson
by
His Attorney.

Patented Dec. 6, 1927.

1,652,134

UNITED STATES PATENT OFFICE.

DAVID P. THOMSON, OF LYNN, MASSACHUSETTS, ASSIGNOR TO GENERAL ELECTRIC COMPANY, A CORPORATION OF NEW YORK.

INCLOSED DYNAMO-ELECTRIC MACHINE.

Substitute for joint application Serial No. 106,083, filed May 1, 1926. This application filed July 1, 1927.
Serial No. 202,954.

My invention relates to dynamo-electric machines of the inclosed type and particularly to the ventilation and cooling of such machines. An object of my invention is the provision of an improved construction for such machines which, while simple and manufacturable at a relatively low cost, results in a greater output of the machine and in general a more satisfactory operation under circumstances which require the use of this type of machine.

My invention will be better understood from the following description taken in connection with the accompanying drawing, and its scope will be pointed out in the appended claims.

Figure 1:
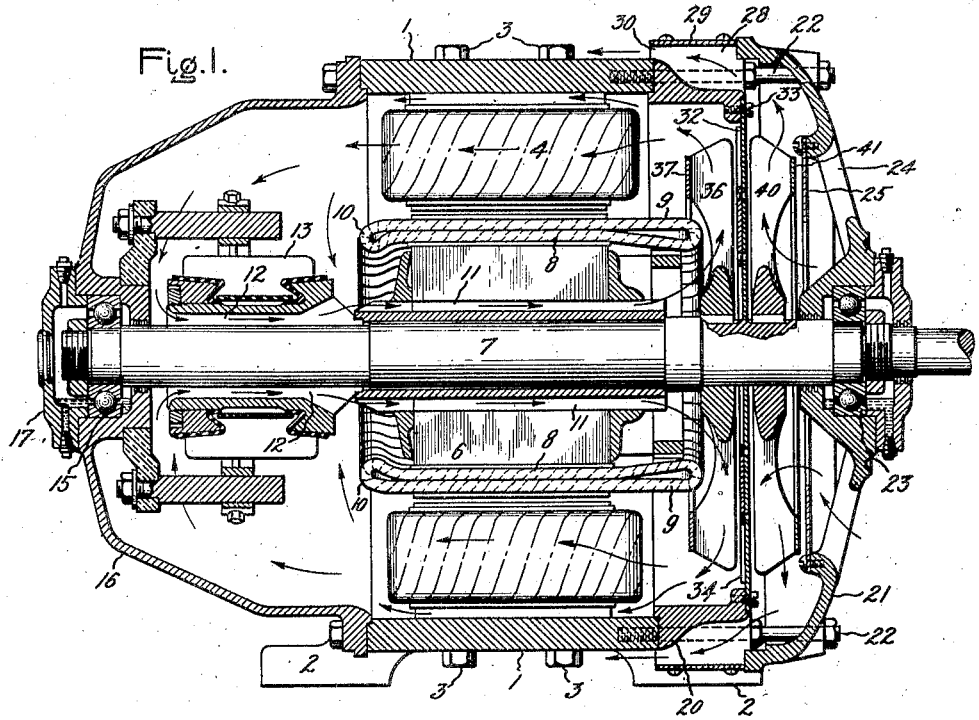
Figure 2:
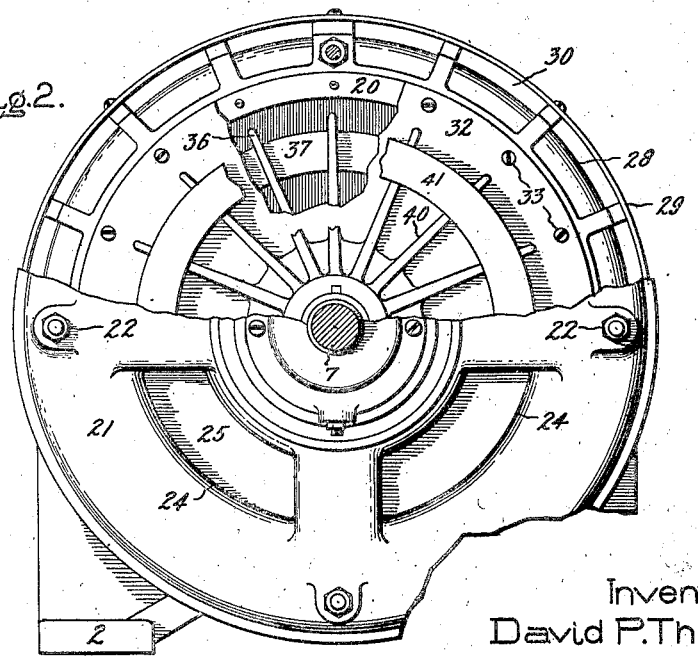

Referring to the drawing, Fig. 1 is a longitudinal sectional view of an embodiment of my invention and Fig. 2 is an end view of the same with parts broken away.

In the drawing the stator frame 1 is shown in the form of a cylinder having feet 2 and to this frame are fixed, as by bolts 3, the field poles having the windings 4. The rotor comprises the core structure 6 mounted on the shaft 7 and carrying windings 8 having end turns 9 and 10. The core structure 6 is provided with longitudinal ventilating openings 11 near the shaft and similarly arranged openings 12 are also provided in the commutator 13. At the commutator end, the shaft 7 is journalled in the bearing 15 carried by the end head 16 which is secured to the stator frame 1 so as to make a tight joint therewith. The outer end of the bearing is shown closed by a plate 17 which also forms an oil well for the bearing.

At the other end of the stator frame is the ring 20 and the end head 21 which are secured together and to the frame by the bolts 22. End head 21 carries the bearing 23 for the shaft and adjacent the bearing are air inlet openings 24. An annular plate 25 attached to the end head cooperates with the outer fan to be described later in directing the cooling air currents.

The outer periphery of the ring 20 is formed with a series of wide slots 28 which are closed except for their two ends by the band 29. Passages are thus formed through which cooling air is received from the space within the end head 21 and is discharged in an axial direction over the exterior surface of the frame. The slots 28 are so formed that the outlet portions 30 are somewhat constricted, thereby forming nozzles for giving the discharged air a greater velocity. On the outer face of the ring 20 is the thin partition or end wall 32 being shown fixed thereto by screws 33 and being preferably of good heat conducting material. This partition in cooperation with the ring 20, the frame 1 and the end head 16 forms a closed chamber for the active elements of the machine. The partition 32 has a central opening through which the shaft extends and with which the shaft makes a fairly close fit. For stiffening the partition and for preventing possible buckling of the same, particularly during the assembly of the machine, I have provided stiffening ribs 34 which are shown secured to the partition by small rivets. Machines of this type are particularly well adapted for use in locations where the surrounding air is laden with foreign matter, such as moisture, dust, dirt, etc., which are detrimental to the active elements of the machine. The closed chamber of such a machine may, by simple means such as gaskets, be sealed against the entrance of foreign matter at all points except where the shaft projects therefrom. By arranging the joint between the rotatable and stationary members of the machine at the surface of the shaft as in the present construction, the length of the joint and the resulting liability to leak is reduced to a minimum. For most purposes a clearance of about 20 mils between the shaft and the partition is satisfactory. Where greater tightness is required such, for example, as in chemical works, the clearance space may be closed by a suitable gasket.

For producing a circulation within the closed chamber I provide the fan 36 fixed to the shaft as, for example, by a key and having a shroud 37. The fan blades are shown cut away at one side to receive the end turns 9 of the rotor winding and the shroud overlies the outer ends of the end turns. By this construction a more effective circulation is produced from the openings 11 in the rotor core past the end turns 9 along the inner surface of the partition 32 where considerable heat is lost and back through the openings in and between the stator poles.

On the outer side of the partition 32 and close thereto is the fan 40 also fixed to the shaft and provided with the shroud 41. The blades of this fan are shown cut away on their outer sides and the shroud is arranged close to the plate 25 whereby a more effective flow of cooling air is produced from the inlet openings 24 in the adjacent end head, along the outer surface of the partition 32 and finally out through the nozzles 30 where it is blown over the outer surface of the stator frame and follows the contour of the end frame 16.

The shrouds 37 and 41 are arranged substantially the same distance from the axis of the shaft so that the zones of air moving over the surface of the plate 32 at the highest velocity inside and outside of the machine will be at substantially the same radial distance from the axis of the shaft 7 which insures the maximum rate of transfer of heat from the air within the machine to that circulated over the outside thereof.

In order to prevent foreign matter carried in the circulating air accumulating on the plate 32, the fan blades 36 and 40 are arranged closely adjacent the surfaces on each side of the plate which causes a rapid circulation of air directly over the surfaces.

What I claim as new and desire to secure by Letters Patent of the United States, is:—

1. A dynamo-electric machine having a rotor member comprising a shaft, a stator member comprising a casing forming a closed chamber including a thin wall of high heat conductivity attached to said stator member and provided with an opening slightly larger than the diameter of said shaft, a fan on each side of said wall secured to said shaft, each fan having blades conforming to the surface of said plate and extending closely adjacent thereto, in order to force air on both sides of said wall over the surfaces thereof in intimate contact therewith and to facilitate a rapid transfer of heat from the air inclosed in said casing to the air circulated over the outside thereof.

2. A dynamo-electric machine having a rotor member comprising a shaft, a stator member comprising a casing forming a closed chamber including a thin wall of high heat conductivity attached to said stator member and provided with an opening slightly larger than the diameter of said shaft, a fan on each side of said wall secured to said shaft, each fan comprising blades attached to said saft extending radially from the shaft with edges conforming to the shape of said wall, and each fan being provided with a shroud attached to said blades at the edges thereof remote from said wall, in order to force air on both sides of said wall over the surfaces thereof in intimate contact therewith and to facilitate a rapid transfer of heat from the air inclosed in said casing to the air circulated over the outside thereof.

3. A dynamo-electric machine having a rotor member comprising a shaft, a stator member comprising a casing forming a closed chamber including a thin wall of high heat conductivity attached to said stator member and provided with an opening slightly larger than the diameter of said shaft, a fan on each side of said wall secured to said shaft, each fan comprising blades attached to said shaft extending radially from the shaft with edges conforming to the shape of said wall, and each fan being provided with a shroud attached to said blades at the edges thereof remote from said wall and at the same radial distance from the axis of said shaft, in order to force air on both sides of said wall over the surfaces thereof in intimate contact therewith and to facilitate a rapid transfer of heat from the air inclosed in said casing to the air circulated over the outside thereof.

In witness whereof, I have hereunto set my hand this twenty-ninth day of June, 1927.

DAVID P. THOMSON.